Dec. 14, 1948.                    W. JOHNDREW                    2,456,125
                            AUTOMATIC MULTIPLE RIVETER
Filed July 28, 1942                                          10 Sheets-Sheet 1
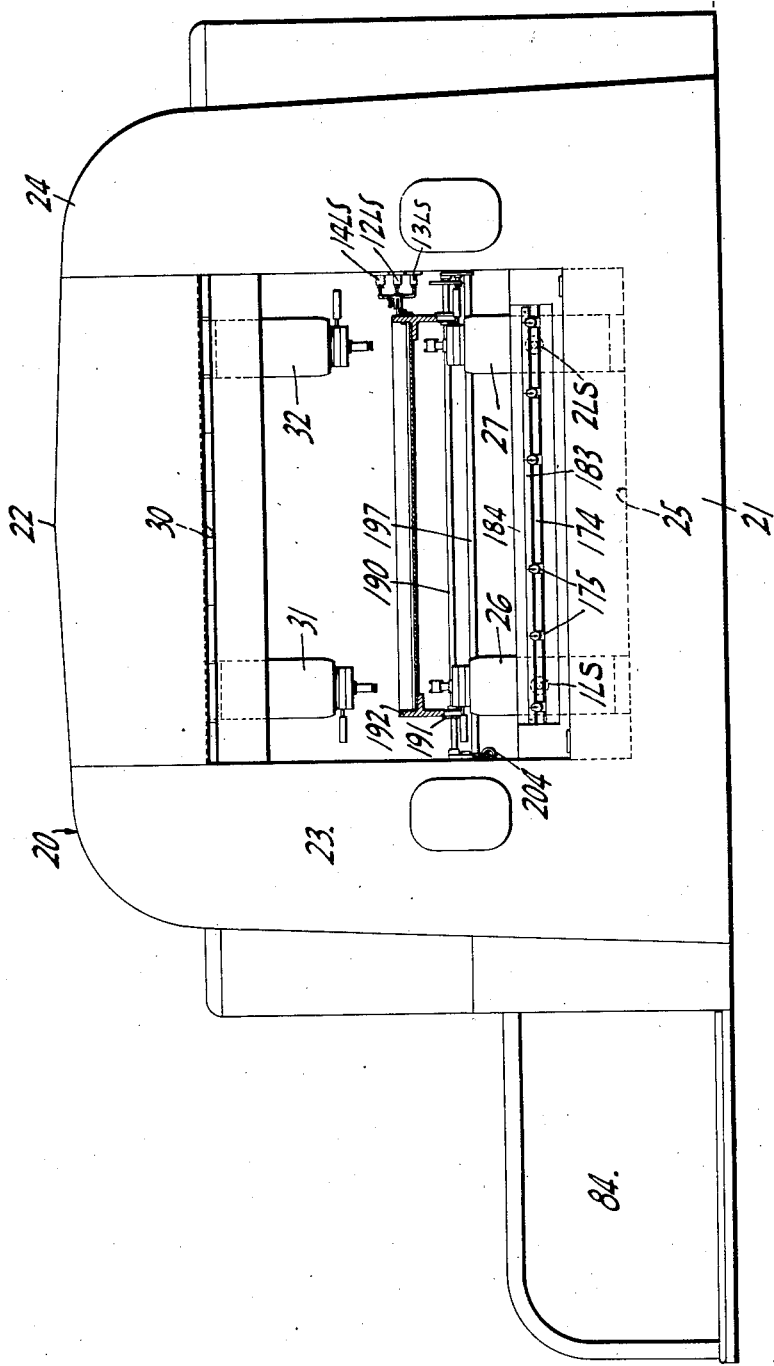
INVENTOR
WILBUR JOHNDREW
BY
Bean, Brooks, Buckley & Bean
ATTORNEYS

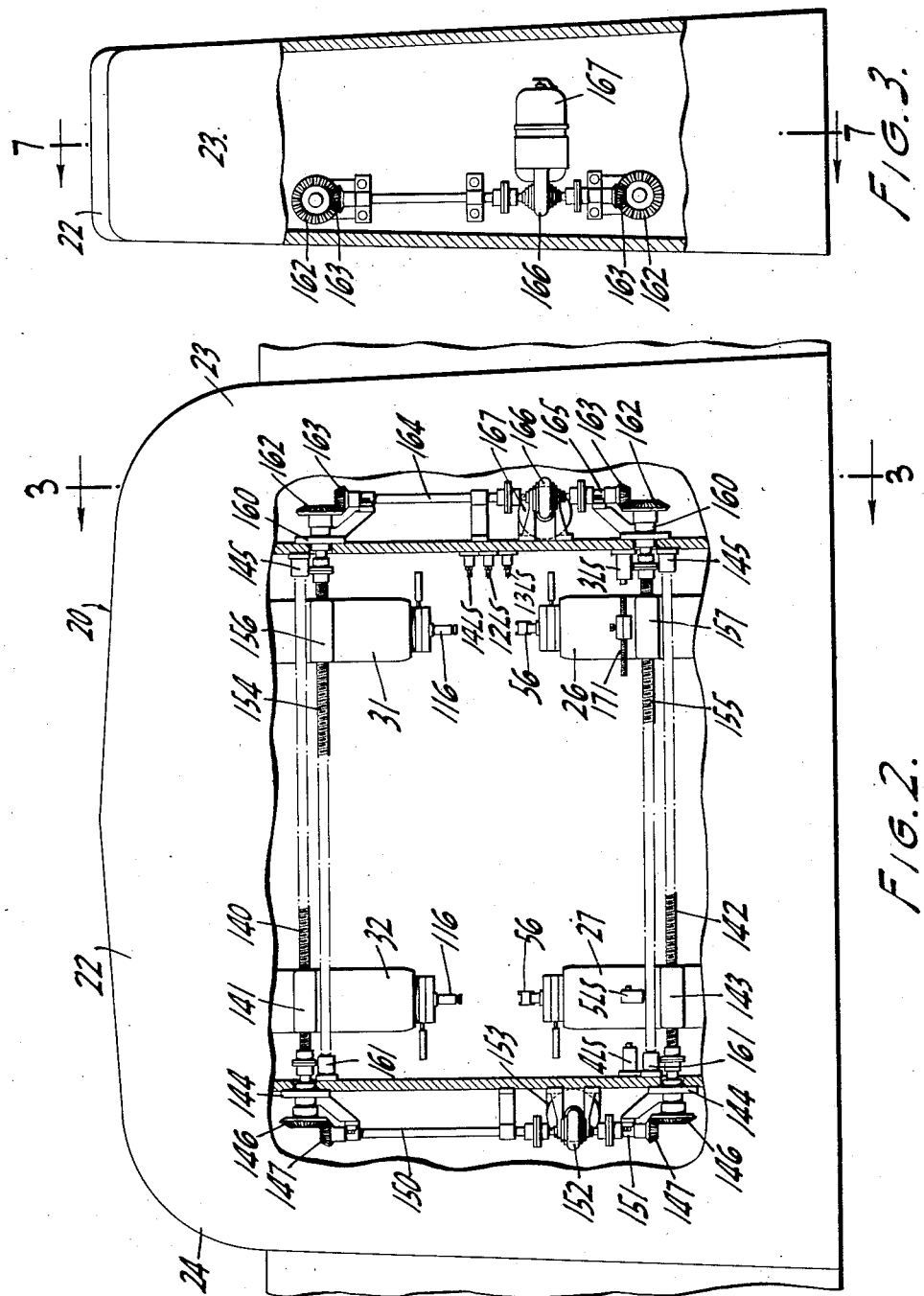

Dec. 14, 1948.    W. JOHNDREW    2,456,125
AUTOMATIC MULTIPLE RIVETER
Filed July 28, 1942    10 Sheets-Sheet 3
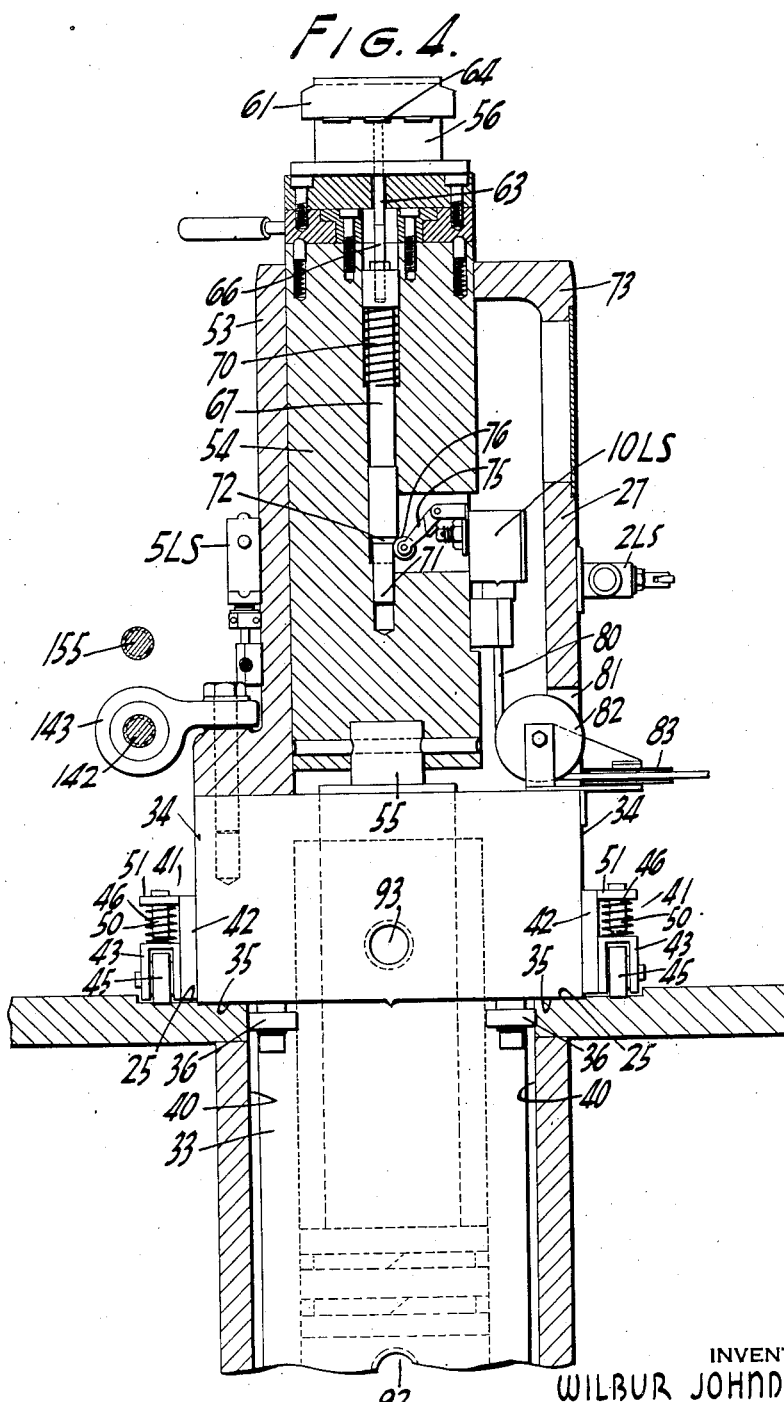
INVENTOR
WILBUR JOHNDREW
BY
Bean, Brooks, Buckley & Bean.
ATTORNEYS

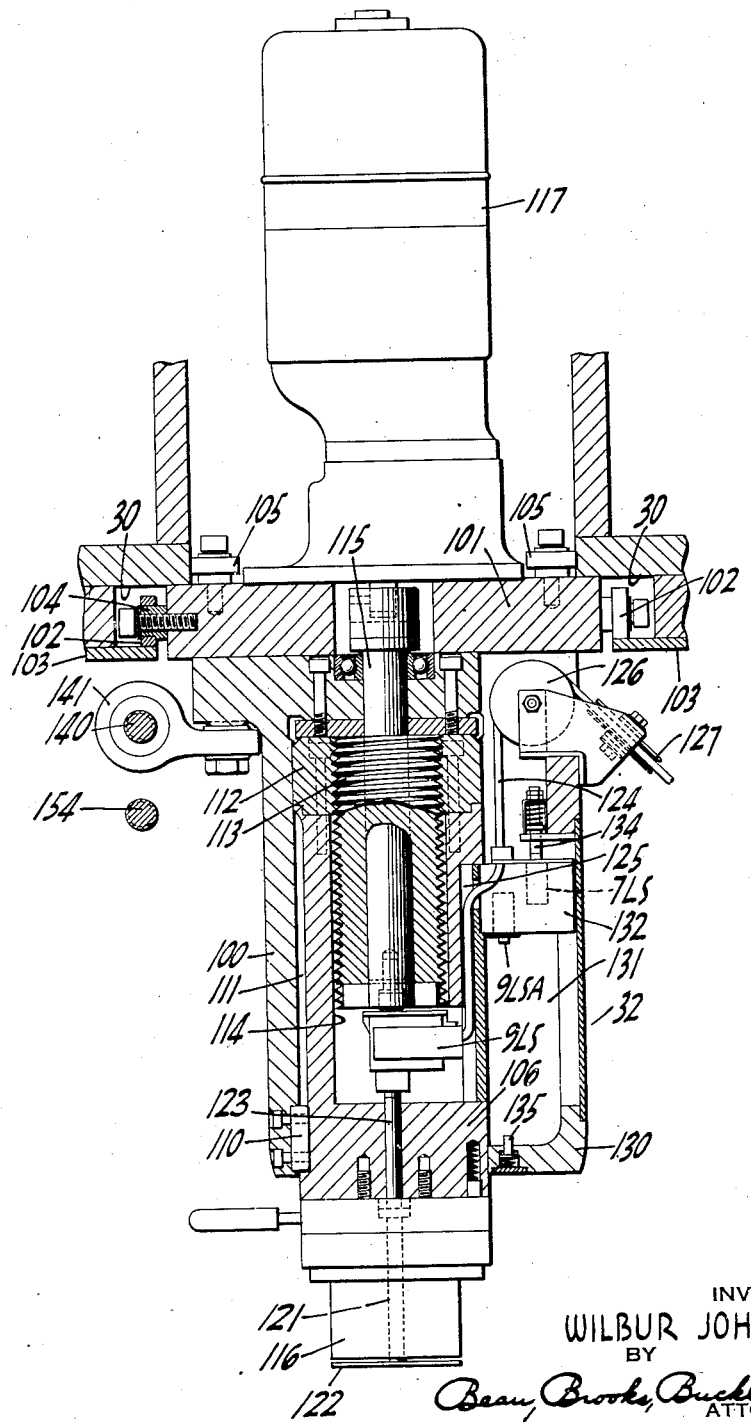

Dec. 14, 1948.    W. JOHNDREW    2,456,125
AUTOMATIC MULTIPLE RIVETER
Filed July 28, 1942    10 Sheets-Sheet 5
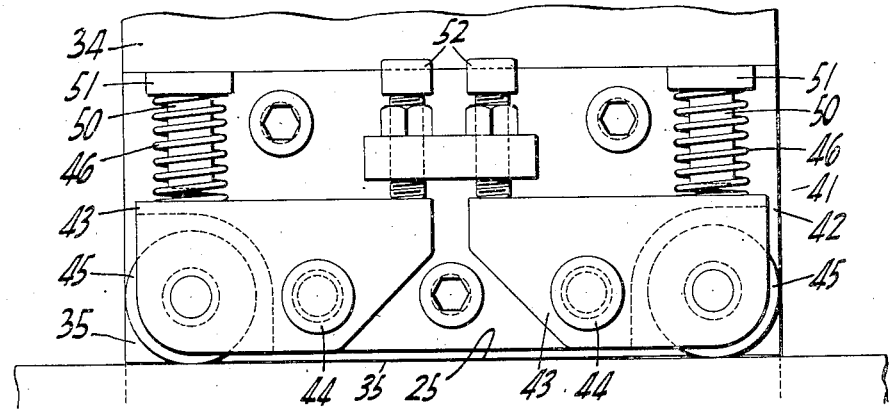
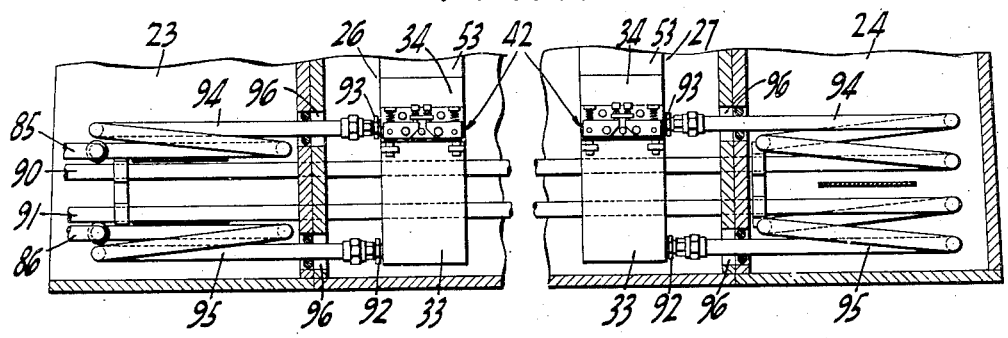
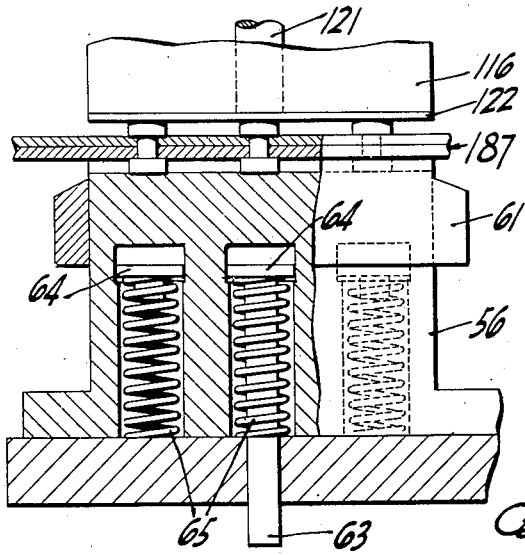
INVENTOR
WILBUR JOHNDREW
BY
Bean, Brooks, Buckley & Bean
ATTORNEYS Dec. 14, 1948.    W. JOHNDREW    2,456,125
AUTOMATIC MULTIPLE RIVETER
Filed July 28, 1942                 10 Sheets-Sheet 6
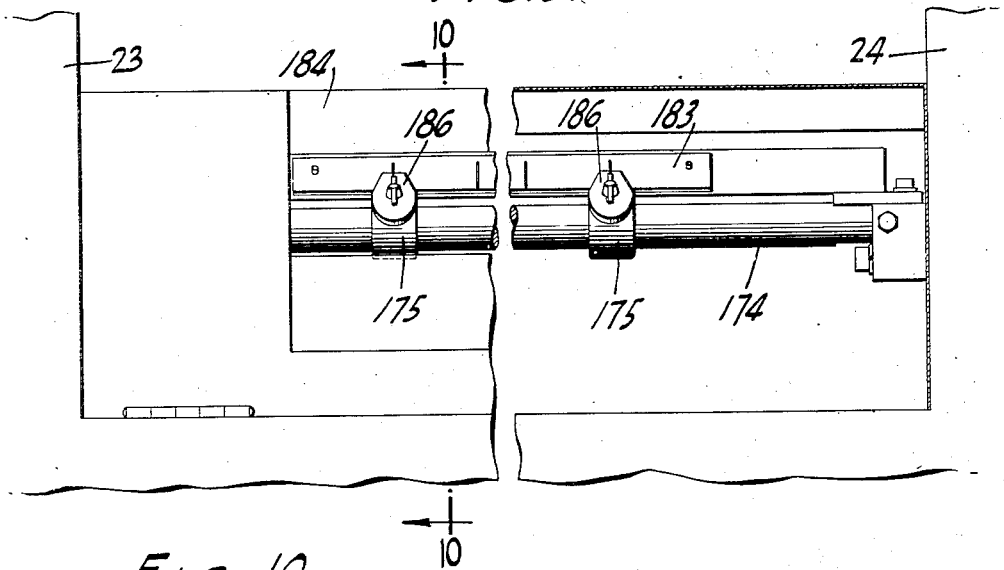
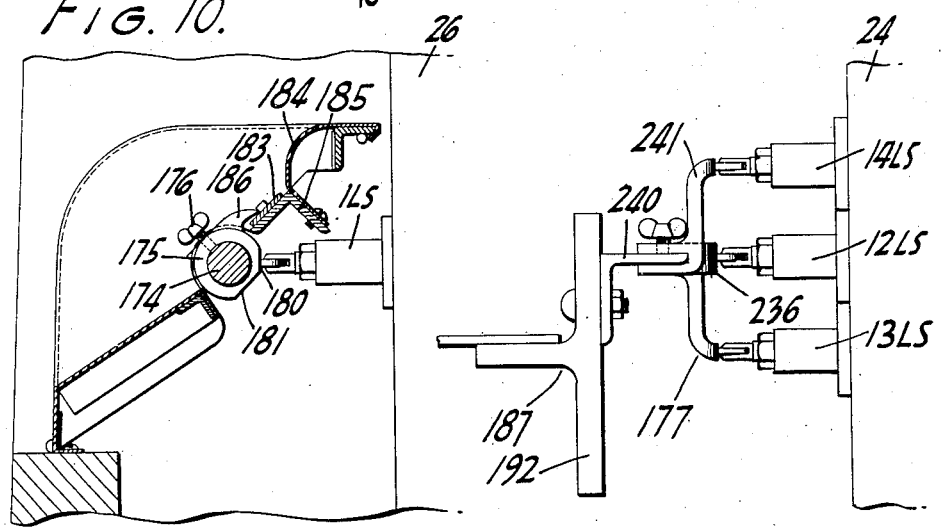
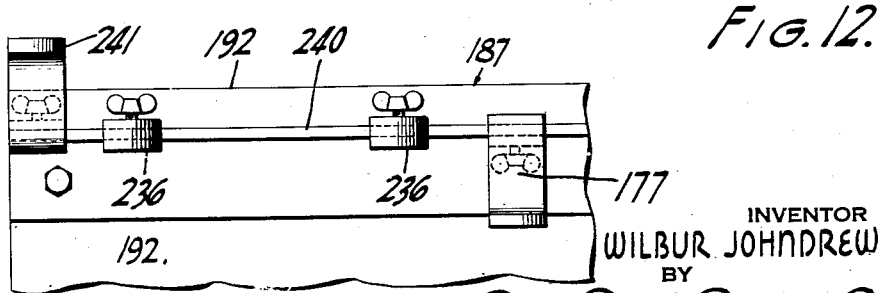
INVENTOR
WILBUR JOHNDREW
BY
Bean, Brooks, Buckley & Bean.
ATTORNEYS Dec. 14, 1948.  W. JOHNDREW  2,456,125
AUTOMATIC MULTIPLE RIVETER
Filed July 28, 1942  10 Sheets-Sheet 7

INVENTOR
WILBUR JOHNDREW
BY
Bean, Brooks, Buckley & Bean
ATTORNEYS

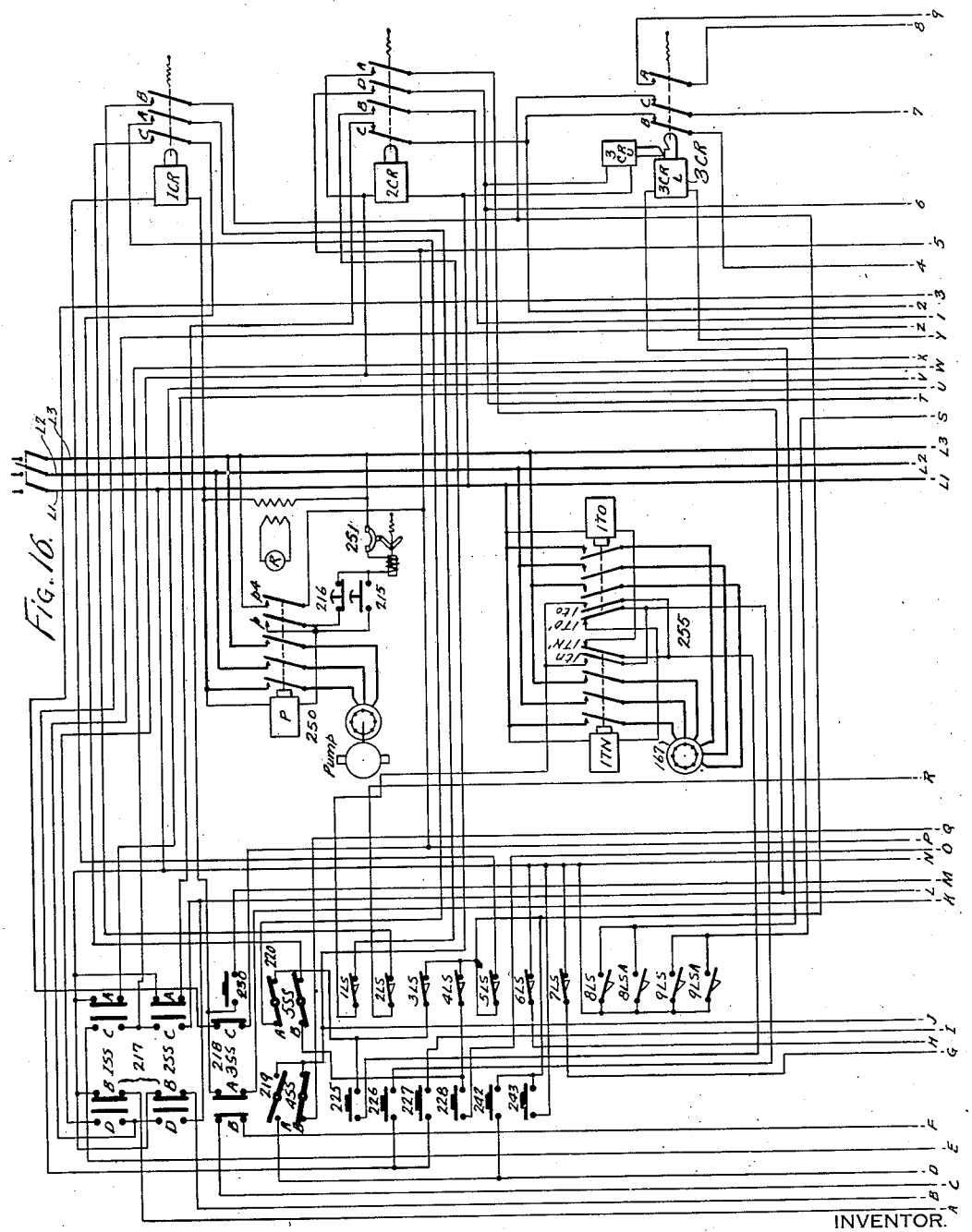

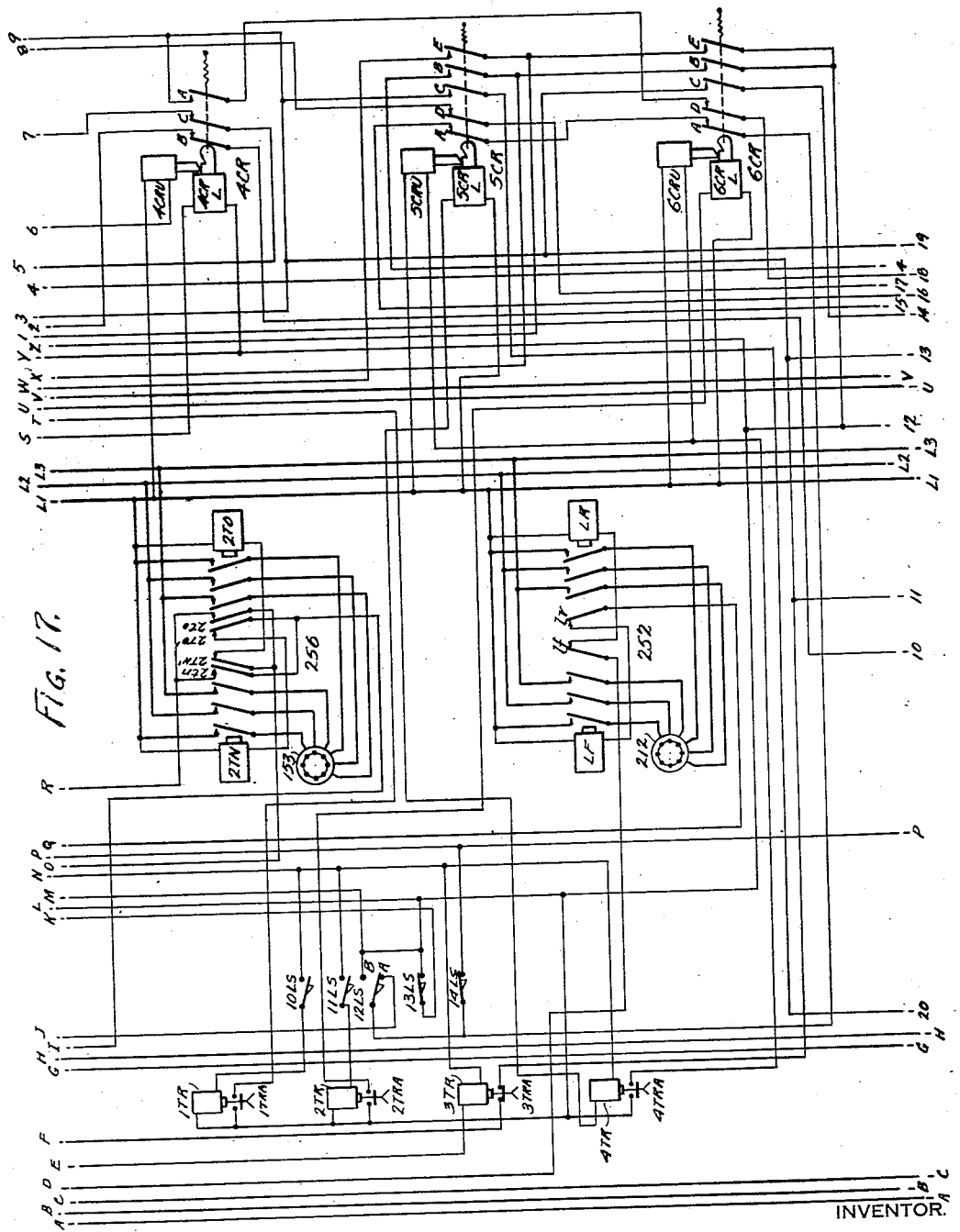

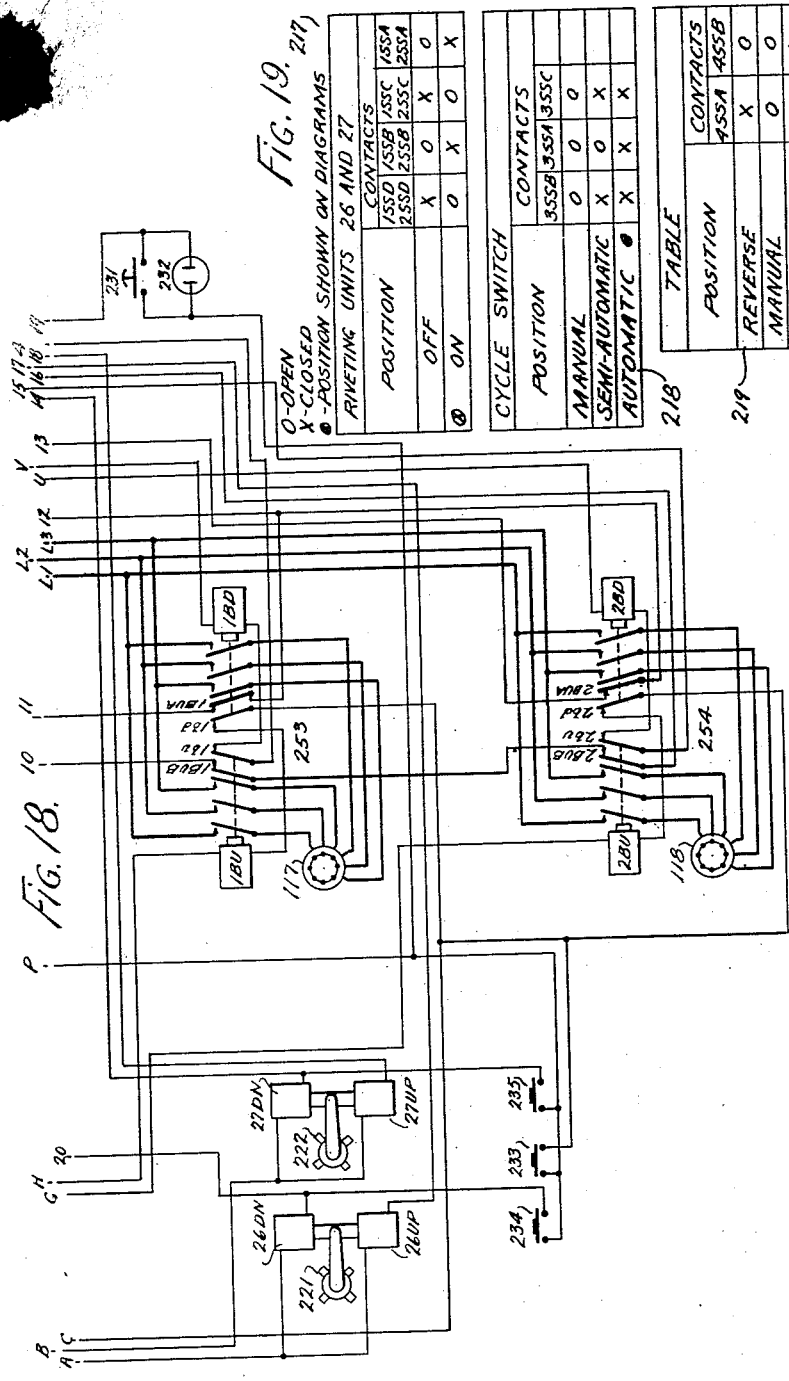

Patented Dec. 14, 1948

2,456,125

UNITED STATES PATENT OFFICE 2,456,125

AUTOMATIC MULTIPLE RIVETER

Wilbur Johndrew, Buffalo, N. Y.

Application July 28, 1942, Serial No. 452,606

20 Claims. (Cl. 78—48)

My invention relates in general to riveting machines and more particularly to machines having a riveting anvil and a cooperating bucking tool adapted to be moved in unison transversely of the workpiece to various positions where rivets are to be acted upon, the workpiece being movable longitudinally to bring the rivets in registration with the riveting anvil.

The principal object of my invention is to provide a machine of this nature having one or more groups of riveting anvils and cooperating bucking tools adjustable in horizontal planes for use either singly as a unit upon a rivet, or simultaneously upon a number of rivets.

Furthermore, it is an object of my invention to provide means for laterally moving the groups of riveting units and cooperating bucking units to various predetermined positions, and to separately move the workpiece or a table carrying the same to bring the rivets to be acted upon in registration with the riveting units.

Moreover, it is an object to provide a riveting machine in which the functions may be sequentially accomplished by automatically governed means, by semi-automatic means, or in any desired sequence by manual means.

Another object is to provide a machine of this type in which the bucking tools are movable downwardly to a point of contact with the workpiece, means being provided for stopping the downward movement when the riveting plane has been reached.

Another object is to provide means for automatically governing the feeding of the workpiece in timed relation to the upward and downward movements of the bucking and riveting units.

Moreover, my device is so designed that the downward stroke of the bucking ram comes to rest at the riveting plane upon contact with the workpiece.

Moreover, means are provided which are responsive to the downward movement of the bucking tool for causing the riveting tools to be moved upwardly to perform their functions.

Another object is to provide the bucking and riveting units with anti-friction means which hold the units off their ways when lateral adjustments are being made, but which yield and allow direct support upon the ways during the riveting operation.

Furthermore, it is an object to provide a riveting machine so designed that the height of the rivet head shall be controlled by time-delay means.

Moreover, my device is provided with adjustable time-delay means governing the return movement of the rams of the bucking and riveting units so that protruding parts of the workpiece may have ample clearance.

The above objects and advantages are accomplished by the device shown in the accompanying drawings of which:

Fig. 1 is a front elevation of our complete device.

Fig. 2 is a rear elevation thereof with portions broken away to show the feeding mechanism for the bucking units and riveting units.

Fig. 3 is a fragmentary sectional view of the housing, taken on a line 3—3 of Fig. 2.

Fig. 4 is an enlarged fragmentary sectional view of one of the riveting units taken on its longitudinal centerline.

Fig. 5 is an enlarged fragmentary sectional view of one of the bucking units and is taken on its longitudinal centerline.

Fig. 6 is an enlarged, fragmentary, sectional view of a riveting unit and cooperating bucking unit in positions when a riveting operation has been completed.

Fig. 7 is an enlarged fragmentary view taken on line 7—7 of Fig. 3, showing suitable fluid supply means connected to the hydraulic cylinders of the riveting units for causing the operation thereof.

Fig. 8 is an enlarged side elevation of the anti-friction supporting means for one of the riveting units.

Fig. 9 is an enlarged front elevation of the gauge and stop means for controlling the transverse movement of the bucking units and riveting units.

Fig. 10 is a transverse sectional view of the gauge means shown in Fig. 9 and is taken on line 10—10 of that figure.

Fig. 11 is an enlarged fragmentary side view of the gauge and stop means governing the longitudinal travel of the workpiece or work table.

Fig. 12 is an end view of that portion of the device shown in Fig. 10.

Fig. 16 is a fragmentary portion of a line diagram of the electrical controls and circuits preferably employed in carrying out our invention.

Fig. 17 is another fragmentary portion of the line diagram and is a continuation of that portion shown in Fig. 16.

Fig. 18 is another fragmentary portion of the line diagram and is a continuation of that portion shown in Fig. 17.

Fig. 19 is a target chart showing the general control switches and their contacts.

Figures 13, 14, 15:
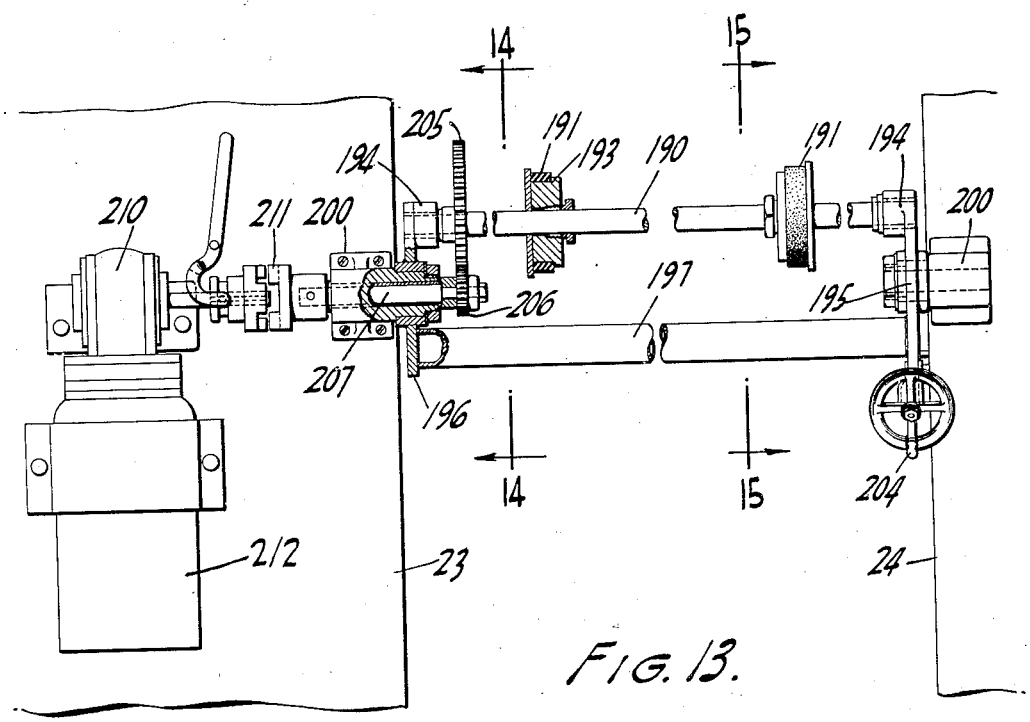
Fig. 13 is an enlarged fragmentary front elevation, partly in section, of the workpiece or table feeding device.
Fig. 14 is a fragmentary sectional elevation of the feeding mechanism shown in Fig. 13 and is taken on line 14—14 of that figure.
Fig. 15 is a similar view of the feed mechanism of Fig. 13 and is taken on line 15—15 of that figure.

My machine comprises in general a housing 20 within which all of the working parts of our invention are inclosed or upon which they are supported. This housing comprises a base member 21 and an interspaced upper member 22 joined to the base member by side members 23 and 24. The base member is provided with horizontally disposed lateral guide ways 25 for the support of the riveting units 26 and 27. In like manner the upper member 22 is formed with lateral guide ways 30 for the support of the bucking units 31 and 32. These guide ways are shown enlarged in Figs. 4 and 5.

Each of the riveting units comprises a hydraulic cylinder 33 having a head 34 extended from each side at the upper end of the cylinder thereby providing overhanging flanges 35 for the support of the entire riveting unit upon the lateral guide ways 25. The unit is guided in its transverse movement along the ways 25 preferably by means of guide rollers 36 which engage with the inner surfaces 40 of the guide ways. In order to reduce the friction of the riveting units upon their ways when being adjusted laterally, I preferably provide suitable anti-friction means each of which comprises a riveting unit support 41 (see Fig. 8) having a supporting bracket 42 secured to each of the flanges 35 of the head 34. Each bracket has two roller yokes 43 pivotally mounted intermediate their ends upon pins 44 carried by the bracket. A roller 45 is pivotally carried at one end of each of the yokes and is pressed downwardly by means of a yoke spring 46. Each yoke spring is mounted upon a spring pilot 50 and has its upper end bearing against a flange 51 formed on the bracket 42 and its lower end bearing against the top surface of the yoke at its roller end. The springs 46 are so designed that their combined resistance against compression is sufficient to support the weight of the riveting unit, and the positions of the rollers are adjusted by means of set screws 52 carried by the bracket and engageable with the end of the yokes opposite the rollers. The amount of space between the heads 34 and the ways may thus be governed. Obviously, when thrust is put upon the unit when riveting the tension of the springs will be overcome and the heads 34 will be forced down upon their guide ways.

Mounted above each hydraulic cylinder 33 is a ram housing 53 which is suitably secured to the head 34 thereof and within which is slidably mounted a riveting ram 54. Each hydraulic cylinder is provided wtih a plunger 55 which is suitably attached to the ram 54, as shown in Fig. 4.

Mounted on top of the riveting ram 54 is the riveting anvil 56 of our device. This anvil is preferably designed for acting upon a number of rivets simultaneously and, therefore, it is preferably rectangular in form. Mounted upon the riveting anvil 56 is a spring-pressed pressure rail 61 of a design similar to that shown and described in Patent No. 2,365,147, granted December 12, 1944, to Thomas H. Speller. This pressure rail is kept normally in its upwardly extended position as shown in Fig. 6 by means of springs 65 and movable downwardly relative to the anvil 56 upon contact with the bottom surface of the workpiece. A rail-motion rod 63 having a T-shaped head 64 at its upper end is slidably mounted within the anvil. This head engages with the pressure rail and one of the springs 65 serves to keep the head pressed upwardly against the bottom surface of the rail. The rod 63 extends downwardly and engages the upper end of a plunger stem 66 carried by a switch plunger 67. This plunger is mounted within an aperture formed in the riveting ram 54 and is held in its upper position by means of a plunger spring 70. The lower end of the switch plunger is provided with a reduced portion 71 thereby forming a shoulder 72. A rail limit switch 10LS is carried by the ram of the riveting unit 27 and a rail limit switch 11LS is likewise carried by the ram of the unit 26. Each of these switches is mounted within a projecting portion 73 of each ram housing and each is actuated by a switch arm 75 having a roller 76 at its outer end. The roller is designed to be engaged by the shoulder 72 of the switch plunger 67 when the plunger is moved downwardly relatively to the riveting ram. Each of the rail limit switches and coacting shoulders 72 are so relatively located and positioned that the limit switch may be closed at any desired predetermined position within the range of movement and irrespective of the relative positions of the anvil and rivet ends. It is preferable, however, to so adjust the parts that these limit switches are closed before the riveting anvil has reached a position of contact with the lower ends of the rivets or immediately thereafter. When these switches 10LS and 11LS are closed at the predetermined time, each of them, respectively, sets in operation time-delay relays 1TR and 2TR (see Figs. 16, 17 and 18) which initiates a timing period for each ram and determines the remaining travel of the riveting anvil which is required to complete the heading of the rivets. A cable 80 extends from each of the rail limit switches and passes out of the projecting portion 73 of the ram housing through an opening 81 in each housing and over sheaves 82 and 83 carried thereby.

In Fig. 7, I have shown the fluid connections to the hydraulic cylinders 33 of the riveting units. These hydraulic cylinders are preferably operated by fluid under pressure such as oil and the pumping equipment, which is standard manufacture and, therefore, not shown or described, may be located in the pumping compartment 84 of the housing 20. This compartment is preferably extended from one side of the housing as shown in Fig. 1 and suitable inlet pipes 85 and 86 are provided for the cylinder 33 of the riveting unit 26, and suitable inlet piping 90 and 91 are provided for supplying fluid to the cylinder of the riveting unit 27. Each of the cylinders of these units is provided with a lower inlet connection 92 and with an upper inlet connection 93 for causing the plunger 55 of the hydraulic cylinder to be moved upwardly or downwardly, respectively. Inlet pipes 85 and 90 are connected to the upper inlet connections 93 of each of the cylinders by means of flexible conduits 94. In like manner inlet connections 86 and 91 are connected to the lower inlet connections 92 of the cylinders of units 26 and 27, respectively, by means of flexible conduits 95. These conduits are arranged in spiral formation within the side members 23 and 24 of the housing, and pass through suitable openings 96 formed in the housing walls, thereby permitting free transverse movement of the riveting units.

Suitable solenoid-operated valves diagrammatically indicated in Fig. 18, as 221, 221 and 222, 222 are provided for supplying fluid under pressure to the hydraulic cylinders 33. These valves are of standard manufacture and are of what is known as a 4-way type, valve 221 being operated by two solenoids 26DN and 26UP, and valve 222 being operated by two solenoids 27DN and 27UP, also diagrammatically illustrated in Fig. 18. The valves are spring-centered so that when both solenoids are de-energized the flow of fluid to either end of the cylinder which it controls will be prevented but the free flow of fluid back to the reservoir will be permitted. These two solenoids are shown by the dotted lines in Fig. 18 as being mechanically interlocked. When solenoid 26UP or 27UP is energized, the respective rams of the riveting units will be moved upwardly. In like manner, when the solenoids 26DN or 27DN are energized, the rams of the riveting units will be moved downwardly. The valves are so connected to the supply pipes of the hydraulic cylinders that the energization of solenoids 26DN or 26UP will cause the flow of fluid under pressure to supply pipes 90 or 91, respectively. Likewise, the energization of solenoid 27DN or 27UP will cause the flow of fluid under pressure to supply pipes 85 and 86, respectively. The sequential operation of these various solenoids will be hereinafter described.

Each of the bucking units 31 and 32 comprises a bucking ram housing 100 which is secured to and suspended from a base plate 101. The upper surface of this plate is designed to bear against the surfaces of the lateral guide ways 30 when the upward pressure is placed upon the unit. The unit is supported normally in its inoperative position by means of supporting rollers 102 projecting outwardly from the base 101 and carried by a support rail 103 arranged at each side of the base and in interspaced relation with the guide ways 30. Each of these rollers is preferably mounted upon an eccentric bushing 104 (Fig. 5) which may be rotated so that the base plate will be normally supported with just enough clearance between its upper surface and the lateral guide ways 30 to relieve it from frictional engagement with the guide ways. The base carries guide rollers 105 for engagement with the inner edge surfaces of the guide ways 30 and thereby guides the bucking unit in its lateral movement. Slidably carried by each of the bucking ram housings 100 is a bucking ram 106 which is prevented from relative rotation with the ram housing by a key 110 carried by the housing and engaging a keyway 111 formed in the ram. Each of these rams is designed to be operated by screw means and a nut 112 is, therefore, secured to the upper end of the ram within which a ram screw 113 is mounted. The ram 106 is preferably formed with a centrally arranged longitudinal bore 114 sufficiently large to provide clearance between it and the external diameter of the ram screw. This screw is non-rotatably carried by a drive shaft 115 which is rotatably mounted in the ram housing and suitably connected to a ram motor 117. This motor is provided with suitable gear reduction means (not shown) and with the customary solenoid brake (not shown). The screw 113 is held against axial movement, whereby when rotated it will cause the bucking ram 106 to be moved downwardly and upwardly within the ram housing. Each of the bucking rams 111 is provided with a bucking anvil 116 which, like the riveting anvil, is designed to act upon a number of rivets simultaneously and is, therefore, preferably rectangular in form. Slidably carried by the bucking ram and the bucking anvil is a tripping rod 121 which carries a tripping plate 122 at its lower end. The plate is preferably of the same contour of the bucking anvil and is designed to contact the work just before the bucking anvil is brought to its final position. Suitable means (not shown) prevent the turning of the plate in relation to the anvil. The tripping rod and plate are limited in their downward direction and thereby normally provide a space between the plate and the bottom surface of the bucking anvil, as clearly shown in Fig. 5. Slidably carried by the bucking rams 106 is a switch rod 123 which extends upwardly from the rod 121. Since both bucking units are identical, I have shown but one of them in detail. A bucking limit switch 9LS is mounted within the ram bore 114 of the bucking unit 33 shown in Fig. 5, and a similar limit switch 8LS is carried by the ram of bucking unit 31. Each of these bucking limit switches is designed to be operated by the relative upward movement of the switch rod 123 through the medium of the tripping rod 121 caused by contact of the tripping plate with the workpiece. An electric cable 124 extends from each of the bucking limit switches 8LS and 9LS, upwardly through a channel 125 formed in the ram and over sheaves 126 and 127 carried by the bucking ram housing 100. The bucking ram housing, like the riveting ram housing, is formed with an offset portion 130 thereby forming a recess 131. A switch block 132 is carried by each bucking ram 106 and projects into the recess 131. The block of bucking unit 32 carries two safety stop switches 7LS and 9LSA, (see Fig. 5), the former limiting the upward movement of the ram and the latter limiting the downward movement in the event that the bucking limit switch 9LS fails to operate. The block of the bucking unit 31 is likewise provided with stop limit switches 6LS and 8LSA operating to limit the travel of the ram of this unit in a manner similar to that shown and just described in connection with switches 7LS and 9LSA. Spring pressed stop pins 134 and 135 are carried by each ram housing for engagement, respectively, with the switches 6LS and 8LSA or 7LS and 9LSA.

My device preferably comprises two bucking units 31 and 32 and two cooperating riveting units 26 and 27. Obviously, these units are arranged in pairs and means are provided for causing each pair to be moved laterally in unison, thereby maintaining their registering positions. Each of these means preferably comprises a feed screw 140 connected to the bucking units 32 by means of a screwthreaded sleeve 141, and a screw 142 which is engaged with a screwthreaded sleeve 143 carried by the riveting unit 27. These screws are suitably mounted on bearings 144 and 145, supported by the housing 20. The inner end of these two screws extends beyond the bearings 144 into the side member 24 where each is provided with a bevel gear 146, each engaging a meshing bevel gear 147. The bevel gears 147 are carried by shafts 150 and 151 which are suitably journaled and connected to a gear reduction unit 152 which is driven by means of a lateral feed motor 153. By operating the motor 153 it will be obvious that the bucking unit 32 and the riveting unit 27 will be moved laterally across their respective guide ways in unison. In like manner feed screws 154 and 155 are provided respectively, for the bucking unit 31 and the riveting unit 26. These screws engage with the screwthreaded sleeve 156 and 157 carried, respectively, by the bucking unit 31 and riveting unit 26, respectively. Each of these feed screws is mounted in suitable bearings 160 and 161 and each carries a bevel gear 162 at the outer end. These mesh with bevel gears 163 carried by shafts 164 and 165, which are connected to the speed-reduction unit 166 and driven by means of a lateral feed motor 167. The bucking unit 31 and riveting unit 26 are thus actuated in unison in a manner similar to that of the units 32 and 27, just above described.

Suitable safety switches are provided for limiting the maximum lateral movement of each pair of bucking and riveting units. A limit switch 5LS is preferably carried by the riveting unit 27 and so positioned as to engage a stop rod 171 adjustably carried by the riveting unit 26 when the two riveting units have been moved laterally toward each other the limit of their travel. The switch 5LS controls the circuits energizing either or both of the lateral feed motors 153 and 167. In order to limit the outward lateral movement of the riveting unit 26 I provide a limit switch 3LS, a similar limit switch 4LS being provided for the riveting unit 27. These switches may be carried by the side members in positions to contact the units or they may be carried by the units so as to contact with the wall of the side member. Each of these switches is connected with its cooperating lateral feed motors to interrupt the current when the units have moved outwardly to maximum position.

As hereinbefore stated, it is desirable to control the movements of the riveting anvils and their corresponding bucking tools automatically. In order to accomplish this we provide a plurality of adjustable stops 236, carried by a bar 240, which is secured either to the workpiece 187 or to the work table. These stops are engageable with the limit switch 12LS to bring about the sequential operation of the device as the workpiece is moved along longitudinally, as hereinafter described. A limit stop 241 is carried at the end of the bar 240, whereby, when the workpiece is finished at the end of the longitudinal feed this stop will engage limit switch 14LS and thereby terminate the cycle of operation. This switch is required to be reset before the device can be again operated. A limit switch 13LS is also provided which successively engages a number of stops 177 carried by the bar 240. This switch temporarily interrupts the automatic longitudinal movement of the workpiece or feed table while the units are moved laterally under manual control to act upon rivets located in lateral offset position with respect to the direction of workpiece feed. It is apparent that during the lateral feed of the units, the longitudinal feed circuit through 12LSA is broken by one of the stops 236 which is in position to actuate the switch 12LS synchronously with the actuation of the switch 13LS by engagement therewith of one of the stops 177. In order to stop the lateral movement of the riveting units I provide a stop rod 174 (see Figs. 9 and 10) on which is mounted a plurality of lateral stops 175. Each of these stops is rotatably mounted upon the rod and held in its adjusted position by means of a set screw 176. Each stop is preferably formed with a switch engaging surface 180 so designed as to engage a lateral limit switch 1LS carried by the riveting unit 26 and a similar limit switch 2LS carried by the riveting unit 27. In order to be able to throw one of the stops 175 out of action without removing it from the rod 174, I form a flattened surface 181 on each of these stops. This surface is so spaced from the axis of the rod that when the stop is rotated to bring this surface opposite the switch, it will pass by the switch without actuating it. A gauge plate 183 is carried by a shield 184 extending across the machine between the side members 23 and 24. The gauge is detachably secured to a supporting angle 185 and serves as an indicating means for setting the stops 175 for any particular workpiece, an indicator finger 186 being formed on each of the stops for registration with markings on the gauge. Any number of different gauges may be interchangeably used on the shield for different workpieces. As the riveting units and their coacting bucking units are moved laterally over their respective ways, the lateral stop switches 1LS and 2LS of each of the riveting units will successively contact the stops 175 and interrupt further lateral movement of these units. Each time the current is interrupted to the lateral feed motors 153 and 167 other switch devices are set into motion, as will hereinafter be more fully described, to bring about the sequential operation of the various parts of the machine.

The workpiece is represented in Figs. 11 and 12 of the drawings by the numeral 187. When the workpiece is in such form and shape that it may be fed through the machine, it is not necessary that a feed table be provided for it. However, while I have shown a workpiece of this type, it is obvious that certain types of work require the use of a feed table, and, when used it is fed along through the machine in a manner similar to the feeding of the workpiece as will now be described.

The table or workpiece feeding mechanism of my device comprises a feed shaft 190 which carries two feed rollers 191 each of which is adjustable longitudinally upon the shaft to engage the work table (not shown) or the legs 192 of the workpiece. These rollers are preferably covered with friction material 193 so as to produce a more positive feed upon the workpiece. The shaft 190 is rotatably carried by the arms 194 of rocker brackets 195. Each of these brackets is formed with an arm 196 and these arms are connected together permanently by means of a torque tube 197. The rocker brackets are rotatably mounted upon bearings 200, one carried by each of the side members 23 and 24. The rocker brackets 195 are oscillated back and forth upon the bearings 200 in bringing about the desired elevation of the workpiece which rests upon the feed rollers 191. To accomplish this adjustment an adjusting screw 201 is preferably used. This screw passes through a nut 202 carried by the side member 24, and has its outer end extending through a bracket 203 in which it is held against axial movement. The bracket is pivotally attached to the arm 196 of the rocker bracket so that as the screw is rotated the rocker brackets will be oscillated to bring about the desired adjustment. An adjusting crank or wheel 204 is carried by the outer end of the screw whereby it may be conveniently actuated.

In order to cause the feed shaft 90 to rotate I provide a feed gear 205 which is mounted upon the shaft and which meshes with a pinion gear 206 carried by a drive shaft 207. The shaft 207 is carried by the bearing 208 attached to the side member 23 and it is connected to a gear reduction 210 by means of a clutch 211. The gear reduction is driven by a longitudinal feed motor 212.

While I have described the operation of my device as being preferably automatic, provision is made for its operation either manually or semi-automatically, in which latter case the operation is automatic after having been initiated by a manual operation of the bucking tools. The controls and circuits of my device as shown in Figs. 16, 17 and 18 are, therefore, so arranged and connected that the device may be operated either automatically, semi-automatically or manually.

While I have shown and described my device as operated by means of electric circuits, it is obvious that other means may be employed to bring about the sequential operation of the various parts of my device, as for instance, suitable cam means or suitable fluid pilot control means.

In general, the operation of my device is as follows:

The manual switch 215 (Fig. 16) is first actuated which energizes the solenoid P of motor contactor 250 for causing the operation of the fluid pump shown only in diagram in Fig. 16. This contactor has its own maintaining circuit through contacts p which keep the pump in constant operation while the riveter is being used. A pilot light R, illuminated by the actuation of this switch, indicates the operation of the pump. A master stop switch 216 is connected in series with the maintaining contact p and when this switch is opened it opens these maintaining contacts and stops the operation of the fluid pump. Contactor 250 has contacts p4 which are connected in the line energizing all the control circuits of my device so that when these contacts are opened, current to all circuits will be immediately interrupted. An overload relay 251 is provided in the motor circuit and is so connected that the stop switch will be disconnected if an overload occurs in any one of the motors.

In carrying out my invention I use a number of switches, relays and motors which are all standard articles of manufacture and are, therefore, shown only in diagram in Figs. 16, 17 and 18. These parts are connected in various circuits as will now be described. I employ four separate switches 217, 218, 219 and 220 indicated on the target chart (Fig. 19) and having contacts and connections diagrammatically illustrated in Figs. 16, 17 and 18 and hereinafter specifically referred to. Switch 217 is for controlling the riveting units 26 and 27 and it has two separately operated control arms diagrammatically indicated in Fig. 16, whereby one or the other or both riveting units may be used at any one time. The switch has two separate sets of contacts, one set controlled by each of the switch arms. A set of contacts 1SSD, 1SSB, 1SSC and 1SSA is controlled by one arm, and another set of contacts 2SSD, 2SSB, 2SSC and 2SSA is controlled by the other arm. Switch 218 is for governing the cycle of operation of my device, and has three groups of contacts 3SSB, 3SSA and 3SSC. This switch has three positions: namely, "Manual," "Semi-automatic," and "Automatic," whereby the machine may be operated solely by manual means, may be made to operate semi-automatically or be entirely automatic in its operation. Switch 219 governs the longitudinal movements of the table or the workpiece and is provided with two contacts 4SSA and 4SSB, and three positions; namely, "Reverse," "Manual," and "Forward." Switch 220 is provided for the transverse movement of the riveting units and has contacts 5SSA, and 5SSB. A "Manual" position and an "Automatic" position is provided for on this switch.

Assuming that both riveting units are to be operated automatically, both actuating arms of selector switch 217 will be moved to their "On" position and the cycle switch 218 and the traverse switch 220 will each be actuated to its "Automatic" position (Fig. 19). In this position the cycle switch 218 will have its contacts 3SSB, 3SSA and 3SSC closed. If only one riveting unit is to be employed then the actuating arm of switch 217 which controls the selected unit will be actuated. If the workpiece supported either by the feed rollers 191 or by the work table (not shown) is not in a riveting station, the limit switch 12LS will have its contact A closed, and a circuit will be formed to the operating coil LF of longitudinal feed contactor 252 through closed contacts 4SSB, assuming the table is to be operated in a forward direction. This will operate the feed motor 212 to cause the workpiece or table to be fed longitudinally forwardly. As the table or workpiece is fed in this direction the next preceding previously-set stop will contact the switch 12LS and open contact A closing contact B thereof. When contact B of the limit switch 12LS is closed, current will flow to the solenoids 1BD and 2BD of the bucking ram contactors 253 and 254, respectively, through interlocking contacts 1bu and 2bu, respectively, thereby energizing them and causing the bucking unit motors 117 and 118, respectively, to move the rams thereof in a downward direction.

The bucking rams 111 continue their downward movement until such time as the tripping plates 122 contact the work. Contact with the work will cause the plates to be moved toward the anvils 116 which in turn will close limit switches 8LS and 9LS. These switches control the actuation of contactors 3CR and 4CR each of which is magnetically actuated by two coils 3CRL and 3CRU, and 4CRL and 4CRU, respectively. These contactors are mechanically held and when energized serve to close those circuits shown in Figs. 16, 17 and 18 through 3CRA and 4CRA, respectively, and normally closed contacts 5CRD and 6CRD, respectively, which cause the energization of suitable solenoids 26UP and 27UP, thus operating the cooperating valves 221 and 222. These valves control the up movements of the rams of the riveting units 26 and 27, respectively, by controlling the supply of fluid under pressure to the riveting unit cylinders 33. When solenoids 26UP and 27UP are energized the rams of riveting units 26 and 27 will be moved upwardly until the pressure rails 61 engage the work immediately adjacent the rivets. At a predetermined point in the stroke of the riveting anvils and actuated by the relative movement of the pressure rails therewith, the riveting anvil limit switches 10LS and 11LS will be operated. The closing of these switches initiates a timing period determined by the timers 1TR and 2TR, respectively, which control the riveting time and, therefore, the degree to which the rivets are flattened. These timers which are shown only diagrammatically are preferably of the pneumatic type and are regulated by controlling the escape of contained air. However, if desired, electronic timing may be employed instead of the pneumatic timing. At the end of the predetermined timing period, established by the timers 1TR and 2TR, their respective contacts ITRA and 2TRA close causing the energization of the operating coils 5CRL and 6CRL of the mechanically held contactors 5CR and 6CR. The energization of these contactors will cause the opening of contacts 5CRD and 6CRD, respectively, thereof for disconnecting the solenoids 26UP and 27UP of the cooperating valves 221 and 222, respectively, which control the upward motion of the riveting rams and simultaneously cause the closing of contacts 5CRC and 6CRC, respectively, which energize the solenoids 26DN and 27DN of the cooperating valves 221 and 222 which control the downward motion of the rams.

The simultaneous closing of contacts 5CRB and 6CRB of contactors 5CR and 6CR, respectively, also energizes the bucking ram contactor solenoids 1BU and 2BU through contact 3SSB and series contacts 3TRA of timing relay 3TR thereby operating the bucking head motors 117 and 118 in a reverse direction, and moving the bucking heads upwardly. The termination of the period of actuation of timing relay 3TR stops the upward travel of the bucking rams, thereby insuring that these rams by opening the circuit just described will be retracted a given distance from the work surface after the completion of each riveting operation. Electrical interlocks 1BUA and 2BUA are provided on the contactors 253 and 254, respectively, and are arranged in parallel with each other and with the series connection of the normally open contacts 5CRB and 6CRB of relays 5CR and 6CR, respectively, to insure full bucking ram travel, even though the riveting ram withdrawal is completed in advance, as hereinafter described.

Auxiliary contacts 1f, 1r, 1bu, 2bu, 1bd and 2bd are also provided on longitudinal feed and bucking ram contactors 252, 253 and 254, respectively, for governing the application of current to the solenoids LR, LF, 1BD and 2BD, 1BU and 2BU, respectively of these contactors, whereby the supplying of current to the longitudinal feed motor 212 and bucking motors 117 and 118 in both directions at the same time is avoided.

The closing of contacts 5CRE and 6CRE of contactors 5CR and 6CR, respectively, energizes the coil of contactor 2CR, which establishes its own maintaining circuit through contacts 2CRA and closes normally open contacts 2CRD and energizes the unlatching coils 3CRU and 4CRU of mechanically latched contactors 3CR and 4CR. With the closing of 2CRD the riveting anvil timer 4TR is energized to initiate the time period for the return of the riveting units. At the end of the time delay period determined by the setting of this timer, the opening coils 5CRU and 6CRU, respectively, of mechanically held contactors 5CR and 6CR are energized through contacts 4TRA of timer 4TR, thus ending the down stroke of the riveting rams. When contactors 5CR and 6CR are returned to their normal positions, contacts 5CRA and 6CRA thereof will be closed, which establishes a shunt circuit around 12LSA through interlocks 1BUB and 2BUB and contacts 2CRB, and causes the workpiece to be fed forwardly until the shunt circuit is interrupted by the opening of contact B of switch 12LS. With the opening of contact B of this switch, contact A thereof will be closed which will cause such feeding movement to be continued without terminating the indexing operation.

Longitudinal travel of the table or workpiece continues until the limit switch 12LS is again operated by one of the stops 236 carried by the table or workpiece, whereby the contact A thereof will be opened and contact B thereof closed, thus permitting the riveting cycle to be repeated. When either or both riveting units and cooperating bucking units are to be moved laterally to engage any rivets in offset positions, the normally closed switch 13LS will be opened by one of the preset stops 177, and contact B of switch 12LS will be made and maintained during lateral operations. The automatic operation and table feed will thereby be interrupted until the units are returned to their normal positions as hereinafter described, whereupon the automatic actuation will be resumed.

Automatic longitudinal operation of my device continues until such time as the workpiece has traveled through the device and is completed, at which time limit switch 14LS is opened by contact with the limit stop 241 carried by the table or workpiece, which terminates the forward longitudinal table or workpiece travel. The workpiece is then removed from the feed rollers or from the table, if a table is used, and the table is then returned to its initial position either by hand after the longitudinal table feed motor 212 is disconnected from the feeding rollers by means of the clutch 211. If desired, however, the feed rollers, in cases where a table is used, may be reversed by reversing the direction of operation of the motor 212, and this is accomplished by manually depressing the "Reverse" button 242. The limit switch 14LS must be manually reset to its initially closed position before automatic indexing of the next cycle of operation can be initiated.

With the device set for automatic operation, the lateral movements of the units are brought about by the actuation of the manually operated buttons 225, 226, 227 and 228. When coacting units 26 and 31 are to be moved outwardly then button 225 will be manually operated to energize the solenoid 1TO of transverse feed contactor 255, such movement being interrupted by the actuation of switch 1LS when it engages either of the stops 175. If the units 26 and 31 are to be moved inwardly, then push button 226 will be actuated to energize contactor 255, such inward movement being interrupted by the opening of switch 1LS. If units 27 and 32 are to be actuated transversely, then either push button 227, for inward movement, or button 228, for outward movement, is pressed. These two buttons cause the energization of coils 2TN and 2TO of contactor 255, respectively. When the predetermined amount of inward movement has been accomplished limit switch 2LS will be actuated by stops 175 to interrupt the movement. Holding circuits to contactor 1TO, 1TN, 2TO and 2TN are formed by the switches 1LS and 2LS for indexing purposes. In moving either riveting unit and associated bucking unit to the various laterally-spaced riveting locations, it becomes necessary only to press the manual push buttons momentarily to have the riveting tool continue its movement to the next lateral operating position. If, for any reason, the positions are not to be used in sequence, the riveting tools will be permitted to pass any one station by holding down the push button. Such operation will not interfere with the automatic stopping of the riveting tools at the next sequential position. The riveting tools are returned to their longitudinal riveting positions by the actuation of manual switches 225 and 228. When the lateral movement of the units has been interrupted by engagement of switches ILS and 2LS with one of the stops 175, the automatic riveting cycle is initiated by the operation of the manual switch 230 which causes the bucking rams to move downwardly after which the operation will be substantially the same as hereinbefore described.

Outward movement of the riveting unit 26 and associated bucking unit 31 will be stopped by the opening of safety switch 3LS which will contact the side frame of the housing or any stationary part carried thereby. Safety switch 4LS limits the outward travel of riveting unit 27 and associated bucking unit 32. Limit switch 5LS is a safety switch to stop motion of the riveting units 26 and 27 when they are moved toward each other. This switch which is connected in series with the holding coil of ICR is obviously operated even though one head is used and the other remains stationary. To reset the device for continued automatic operation it is only necessary to press the manual buttons 243 which will cause the table to be moved forwardly in order that the stops 236 and 177 may become disengaged from switches 12LS and 13LS, respectively. Such movement will allow switch 13LS to drop to its normally closed position and will allow switch 12LS to close its contact A and thereby permit the table to be moved forwardly to the next riveting station.

As hereinafter set forth, the operation of my device has been described as being automatic and for such operation the contacts 3SSB, 3SSA and 3SSC of the cycle switch 218 have been closed, as well as contacts 5SSA and 5SSB of transverse location switch 220. When, however, it is desired to operate my device manually, cycle switch 218, table switch 219 and transverse location switch 220 are thrown to their "Manual" positions which causes the opening of all of the contacts which are normally closed when in "Automatic" positions. Under such manual setting, the units may first be moved laterally to the desired positions by the actuation of the selected manual buttons 225, 226, 227 and 228, as just above described. After the units have been adjusted laterally to the desired positions, push button 243 is operated to feed the workpiece or table forwardly to bring the rivets into registration with the anvils of the riveting tools. When the riveting positions have been reached, the bucking arms are lowered by the actuation of the push button 230 until they contact the workpiece and close limit switches 8LS and 9LS. Rivet switch 231 must be held in closed position until the riveting anvils have engaged the work, after which the riveting operation is completed and the riveting rams are automatically returned to their normal position. When the riveting operation is finished the bucking rams are raised by the actuation of push button 233. Limit switches 6LS and 7LS limit the upward movement of the bucking rams of bucking units 31 and 32, respectively. Limit switches 8LSA and 9LSA by the rams of these bucking units act as safety switches in case the limit switches 8LS and 9LS fail to close. They are connected in parallel, respectively, with these last-mentioned switches. While I have shown hand operated switch buttons for manually actuating the various parts of my device, it is obvious that foot switches may be used in place thereof as illustrated in Fig. 18 where a foot switch 232 may be used if desired instead of the hand operated switch 231.

When it is desired to actuate our device by semi-automatic control the cycle switch 218 is moved to "Semi-automatic" position and the traverse location switch 220 moved to its "Automatic" position. With the cycle switch in semi-automatic position contacts 3SSA thereof are opened and 3SSB and 3SSC are closed. This semi-automatic operation is similar to the automatic operation above described except that after the workpiece or work table has been indexed longitudinally, it will be necessary to push the button marked 230 to bring the bucking units into position. When the bucking units have been moved to their operative positions it is required that the operator hold the push button 231 down until such time as the riveting anvils have engaged the work. Further operation of the device will be carried out automatically, as hereinbefore described. In the semi-automatic operation it is, furthermore, necessary to return the bucking units to their initial positions by operating the push button 233.

When only one of the riveting units and cooperating bucking units is to be used, it is necessary that the inactive mechanism clear all portions of the work when operating the machine either in manual, semi-automatic or automatic manner. To accomplish this, the manual buttons marked 234 and/or 235 can be operated to move the riveting heads downwardly beyond their normal positions. In similar manner the bucking units may be moved to their extreme limits of travel by operating the push button 233 after having placed cycle switch 218 in its "Manual" position.

As hereinbefore pointed out "Rivet Unit Switch" 217 has separate switches 1SS and 2SS which are provided in order that either of the riveting units and associated bucking units may be completely disconnected. By this provision a riveting unit with its associated bucking unit may be taken out of service and the machine operated automatically with only one group of units.

While I have shown and described my invention as designed to longitudinally move the workpiece automatically through the machine, and to bring about lateral adjustment of the riveting and coacting bucking units by manually operated means, it is obvious that suitable switches and circuits may be provided for automatically accomplishing these two movements in sequential order. Furthermore, instead of the electrical control devices herein shown and described, it is obvious that fluid or cam means might be employed to carry out my invention. Moreover, my inventive concept is applicable to different types of assembling machines, such, for instance, as welding machines and, therefore, the term "riveting" is used in the following claims in a comprehensive sense.

Having thus described my invention, what I claim is:

1. A riveting machine, comprising a bucking unit, a cooperating riveting unit, means for mounting the bucking unit for movement against a workpiece, means for bringing the riveting unit against the workpiece for riveting operation, and means carried by the bucking unit and operable by and upon the engagement of the workpiece with said last-mentioned means for arresting the latter and initiating the operation of the riveting unit.

2. A riveting machine, comprising a bucking unit, a cooperating riveting unit, means for mounting the bucking unit for movement against a workpiece, means for bringing the riveting unit against the workpiece for riveting operation, means carried by the bucking unit and operable by and upon the engagement of the workpiece with said last mentioned means for arresting the latter and initiating the operation of the riveting unit, and means initiated by the operation of the riveting unit for arresting the riveting operation after it has progressed to a definite point.

3. A riveting machine, comprising a frame having a work-receiving opening defined by upper and lower horizontally disposed frame members, a bucking unit suspended from the upper frame member for horizontal adjustment in the opening, a cooperating riveting unit adjustably supported for horizontal movement in the opening on the lower frame member, station-locating means adjustably arranged laterally across the opening and carried by one of said frame members for controlling the lateral movement of said bucking unit and said riveting unit, means for adjusting the units in unison, means carried by the unit which is adjacent the station-locating means for co-operation therewith for arresting said adjusting means, and means for operating the units in cooperation with one another when so arrested.

4. A riveting machine, comprising a frame having a work feeding opening therein, means for feeding a workpiece through the opening, upper and lower cooperating units for performing a riveting operation upon the workpiece when the workpiece is arrested, and station-locating means carried by the workpiece and cooperating with the feed means for so arresting the latter for such riveting operation.

5. A riveting machine, comprising a frame having a work-receiving opening, means for feeding a workpiece axially of the opening, a pattern guide element for determining the location of the points on the workpiece for riveting operations, an index element cooperating with the pattern guide and forming therewith an arresting means for arresting the feeding means at such predetermined points, one of said elements being movable with the work-feeding means, a riveting unit arranged in the opening, means for moving the riveting unit into operative contact with the workpiece when the latter is arrested, and means actuated by the arresting means for effecting actuation of the unit moving means to perform the riveting operation subsequent to the arrest of the feeding means.

6. A riveting machine comprising an electrically operated bucking unit, electrical feeding means for causing relative movement between the unit and the workpiece, means for arresting the movement of the feeding means and simultaneously initiating movement of the bucking unit against the workpiece fed by the first means, hydraulically operated riveting means for engaging the unformed end of a rivet at the opposite side of the workpiece from the bucking unit, and means operable by the bucking unit by and during its operation for initiating operation of the riveting unit.

7. A riveting machine, comprising an electrically operated bucking unit, electrical feeding means for causing relative movement between the unit and the workpiece, means for arresting the movement of the feeding means and simultaneously initiating movement of the bucking unit against the workpiece fed by the first means, hydraulically operated riveting means for engaging the unformed end of a rivet at the opposite side of the workpiece from the bucking unit, means operable by the bucking unit by and during its operation for initiating operation of the riveting unit, and means associated with the riveting unit and operable upon contact with the workpiece for initiating operation of means for arresting the riveting unit following a predetermined interval subsequent to the engagement of the associated means with the workpiece.

8. A riveting machine, comprising an electrically operable bucking unit, electrical feeding means for causing relative movement between the unit and the workpiece, means for arresting the movement of the feeding means and simultaneously initiating movement of the bucking unit against the workpiece fed by the first means, hydraulically operated riveting means for engaging the unformed end of a rivet at the opposite side of the workpiece from the bucking unit, means operable by the bucking unit by and during its operation for initiating operation of the riveting unit, means associated with the riveting unit and operable upon contact with the workpiece for initiating operation of means for arresting the riveting unit following a predetermined interval subsequent to the engagement of the associated means with the workpiece, and means operable by said arresting means for retracting both units from the workpiece.

9. A riveting machine comprising an electrically operable bucking unit, electrical feeding means for causing relative movement between the unit and the workpiece, means for arresting the movement of the feeding means and simultaneously initiating movement of the bucking unit against the workpiece fed by the first means, hydraulically operated riveting means for engaging the unformed end of a rivet at the opposite side of the workpiece from the bucking unit by and during its operation for initiating operation of the riveting unit, means associated with the riveting unit, means associated with the riveting unit and operable upon contact with the workpiece for initiating operation of means for arresting the riveting unit following a predetermined interval subsequent to the engagement of the associated means with the workpiece, and means operable by and during retraction of the units for restarting the feeding means.

10. A riveting machine, comprising an electrically operable bucking unit, electrical feeding means for causing relative movement between the unit and the workpiece, means for arresting the movement of the feeding means and simultaneously initiating movement of the bucking unit against the workpiece fed by the first means, hydraulically operated riveting means for engaging the unformed end of rivet at the opposite side of the workpiece from the bucking unit, means operable by the bucking unit by and during its operation for initiating operation of the riveting unit, means associated with the riveting unit and operable upon contact with the workpiece for initiating operation of means for arresting the riveting unit following a predetermined interval subsequent to the engagement of the associated means with the workpiece, means operable by said arresting means for retracting both units from the workpiece, and means operable by and during retraction of the units for restarting the feeding means.

11. A riveting machine, comprising a guideway, an anvil, a support for the anvil mounted upon the guideway for movement, means for so moving said support, means carried by the support to actuate the anvil for performing a riveting operation on a workpiece, a plurality of station-locating means cooperating with the support-moving means to arrest the support at each station for such riveting operation, means operable in synchronism with the arresting means for effecting operation of the anvil actuating means, and selective means for rendering any station-locating means inoperative and thereby avoiding the functioning of the anvil, whereby the support may continue its movement along the guideway to the next station.

12. A riveting machine, comprising a bucking unit, a cooperating riveting unit, means mounting the bucking unit for movement against a workpiece, means for bringing the riveting unit against the workpiece for riveting operation, means operable in synchronism with the bucking unit for arresting the latter and initiating the operation of the riveting unit, timing means to arrest the operation of the riveting unit after the lapse of a predetermined time interval and means operable upon the initial contact of the riveting unit with the workpiece for actuating the timing means.

13. A riveting machine comprising a bucking unit, a cooperating riveting unit, means mounting the bucking unit for movement against a workpiece, means for bringing the riveting unit against the workpiece for riveting operation, means carried by the bucking unit and operable by and upon the engagement of the workpiece with said last mentioned means for arresting the latter and initiating the operation of the riveting unit, timing means to arrest the operation fo the riveting unit after the lapse of a predetermined time interval, and means operable upon the initial contact of the riveting unit with the workpiece for actuating the timing means.

14. A riveting machine, comprising a bucking unit, a cooperating movable riveting unit, means for feeding a workpiece between two units, means for positioning the bucking unit against a workpiece when the latter is arrested, means operable at a predetermined point in the travel of the workpiece to momentarily arrest the feeding means for the riveting operation, means operable by and upon the positioning of the bucking unit for initiating operation of the riveting unit against the workpiece, means operated in synchronism with the movement of the riveting unit for predetermining the riveting operation, and means operable by the last-named means for retracting both units from the workpiece subsequent to the riveting operation to enable resumption of operation of the feeding means.

15. A riveting machine, comprising a frame having a work-receiving opening defined by upper and lower transverse frame members, a plurality of units suspended from the upper frame member when inactive upon anti-friction bearings for adjustment toward and from each other, a plurality of units upstanding from the lower frame member and supported when inactive upon anti-friction bearings for adjustment toward and from each other, each suspended unit cooperating with a respective upstanding unit as a pair for performing a riveting operation, means for adjusting the pairs of units laterally toward and from each other within the frame opening, means for feeding a workpiece axially of the frame opening, means cooperating with said feeding means for arresting the same and sequentially actuating said pairs of units for performing a riveting operation, means operable to interrupt the feeding means, selective means operable to initiate operation of the lateral unit adjusting means when the feeding means is interrupted, and means cooperating with the adjusting means for arresting the same and sequentially actuating said selected pair of units for performing a riveting operation.

16. A riveting machine, comprising a bucking unit, a cooperating riveting unit, means for moving said units toward each other to position them against the opposite sides of a workpiece for effecting a riveting operation, said moving means being reversible to return said units to their normal inoperative positions to free the workpiece, and means controlled by the riveting unit on its return movement for feeding the workpiece to present a new point for riveting operation.

17. A riveting machine, comprising a bucking unit, a cooperating riveting unit, means for moving said units toward each other to position them against the opposite sides of a workpiece for effecting a riveting operation, said moving means being reversible to return said units to their normal inoperative positions to free the workpiece, timing means for determining the riveting stroke of the riveting anvil, means controlled by the movement of the riveting anvil for starting the timing means, and means controlled by the movement of said bucking unit and riveting unit for feeding the workpiece to present a new point for riveting operation.

18. A riveting machine, comprising a bucking unit, a cooperating anvil unit, means for supporting a workpiece therebetween, means for positioning the bucking unit in place against one side of the workpiece, means initiated by contact of the bucking unit with the workpiece for imparting a single operative stroke to the anvil unit to effect a riveting operation, time delay means for arresting the operation of the riveting anvil unit after the lapse of a predetermined time interval, and means operable by and during movement of the anvil unit upon its operative stroke to initiate the functioning of the time delay means, whereby the bucking unit is assured of contact with the workpiece prior to the riveting operation.

19. A riveting machine, comprising a frame having a work-receiving opening defined by upper and lower transverse frame members, a plurality of units suspended from the upper frame member for adjustment toward and from each other, a plurality of units upstanding from the lower frame member for adjustment toward and from each other, each suspended unit co-operating with a respective upstanding unit as a pair for performing riveting operation, power means for adjusting the pairs of units laterally toward and from each other, pattern means controlling the operation of the power means, and companion limit means carried by a unit of one pair, said limit means being engageable with the adjacent unit and operable upon failure of said pattern means for limiting the extent of lateral adjustment of said pairs of units.

20. A riveting machine, comprising a frame having a work-receiving opening defined by upper and lower transverse frame members, a plurality of units suspended from the upper frame member for adjustment toward and from each other, a plurality of units upstanding from the lower frame member for adjustment toward and from each other, each suspended unit co-operating with a respective upstanding unit as a pair for performing riveting operation, power means for adjusting the pairs of units laterally toward and from each other, pattern means controlling the operation of the power means, and limit means carried by one unit of each pair, for mutual engagement during inward movement upon failure of said pattern means control, and separate electrical limit means carried by one unit of each pair and a fixed part of the frame for mutual engagement during outward movement upon failure of said pattern means control.

WILBUR JOHNDREW.

REFERENCES CITED

The following references are of record in the file of this patent:

UNITED STATES PATENTS

| Number | Name | Date |
|---|---|---|
| 660,705 | Kimman | Oct. 30, 1900 |
| 1,031,260 | Havener | July 2, 1912 |
| 1,162,742 | Bernard | Dec. 7, 1915 |
| 1,241,257 | Wurts et al. | Sept. 25, 1917 |
| 1,298,555 | Payne et al. | Mar. 25, 1919 |
| 1,397,020 | Smith | Nov. 15, 1921 |
| 1,463,146 | Bernard | July 24, 1923 |
| 1,467,536 | Dornier | Sept. 11, 1923 |
| 1,507,958 | Hansen | Sept. 9, 1924 |
| 1,958,869 | Stever | May 15, 1934 |
| 2,079,042 | Saives | May 4, 1937 |
| 2,148,704 | Merritt | Feb. 28, 1939 |
| 2,246,494 | Amiot | June 24, 1941 |
| 2,286,980 | Schanz | June 16, 1942 |
| 2,302,251 | Platz | Nov. 17, 1942 |

FOREIGN PATENTS

| Number | Country | Date |
|---|---|---|
| 2,145 | Great Britain | June 18, 1873 |
| 519,278 | Germany | 1931 |

Certificate of Correction

Patent No. 2,456,125.

December 14, 1948.

WILBUR JOHNDREW

It is hereby certified that errors appear in the printed specification of the above numbered patent requiring correction as follows:

Column 2, line 44, for "Fig. 10" read *Fig. 11*; column 13, line 50, for "arms" read *rams*; line 63, before the word "by" insert *carried*; column 16, line 40, after "unit" insert , *means operable by the bucking unit*;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*